United States Patent [19]

Ikutake

[11] Patent Number: 4,497,102
[45] Date of Patent: Feb. 5, 1985

[54] PROCESS FOR MANUFACTURING A PISTON RING

[75] Inventor: Hiroshi Ikutake, Saitama, Japan

[73] Assignee: Nippon Piston Ring Co., Ltd., Tokyo, Japan

[21] Appl. No.: 510,135

[22] Filed: Jul. 1, 1983

[51] Int. Cl.³ .............................................. B23P 15/08
[52] U.S. Cl. ............................ 29/156.6; 29/156.5 R; 29/412; 29/DIG. 13; 29/DIG. 48; 219/83; 277/236
[58] Field of Search .......... 29/156.5 R, 156.6, 156.61, 29/156.62, 156.63, DIG. 13, DIG. 48, 212; 219/81, 82, 83

[56] References Cited

U.S. PATENT DOCUMENTS

| | | | |
|---|---|---|---|
| 684,617 | 10/1901 | Rathbun | 29/156.6 |
| 1,538,107 | 5/1925 | Giller | 29/156.6 |
| 1,680,369 | 8/1928 | Dugan | 29/156.6 X |
| 2,036,801 | 4/1936 | Fitzgerald | 29/156.6 |
| 2,119,035 | 5/1938 | Ballard | 29/156.6 |
| 2,190,125 | 2/1940 | Sembdner | 29/156.6 X |
| 2,654,977 | 10/1953 | Squibb et al. | 29/156.6 X |
| 3,000,080 | 9/1961 | Ronay | 29/156.6 |
| 3,353,247 | 11/1967 | Kubera | 29/156.6 |
| 3,383,489 | 5/1968 | Ciranko | 219/81 |
| 3,608,347 | 9/1971 | Kemminer | 29/156.6 X |
| 3,628,235 | 12/1971 | Willoughby | 219/83 X |
| 3,805,352 | 4/1974 | DeMontremy | 29/156.6 |
| 3,811,028 | 5/1974 | Henry et al. | 219/83 X |
| 4,258,245 | 3/1981 | Flaherty | 219/81 |

Primary Examiner—Charlie T. Moon
Assistant Examiner—Ronald S. Wallace
Attorney, Agent, or Firm—Sughrue, Mion, Zinn, Macpeak & Seas

[57] ABSTRACT

A process for manufacturing a piston ring is disclosed wherein web-like first metal member which will form a base of a piston ring and web-like second metal member which will form a wear resistant layer of the piston ring are separately fed and joined together. The joined web is subject to curving to gradually decrease a radius of curvature.

4 Claims, 7 Drawing Figures

4,497,102

PROCESS FOR MANUFACTURING A PISTON RING

BACKGROUND OF THE INVENTION

This invention relates to a process for manufacturing a piston ring for an internal combustion engine, particularly a piston ring having a wear-resistant layer on its outer peripheral surface.

A piston ring is required to be wear resistant particularly in its outer peripheral surface defining a sliding surface contacting a cylinder liner. It is, therefore, usual to provide a wear-resistant layer 12 on a base piston ring material 11, as shown in FIG. 1. This layer is usually formed by surface coating, which is realized by chromium plating or spray coating of molybdenum, a ferroally, ceramics or the like, or heat treatment for hardening, such as soft or ionic nitriding, surface remelting or surface layer melting and alloying. The layer formed by surface coating is, however, not satisfactory bonded to the base material, but easily peels or breaks. The heat treatment for hardening is low in productivity, since a long time is required, or since some methods, such as surface melting, render the surface so rough as to require posttreatment, though the heat treatment itself may be carried out in a short time.

There are piston rings in which a different material is embedded, for example, a ferrox insert, or a soft metal such as copper or lead. These piston rings are manufacturing by filling a groove in a base piston ring material with powder of any such different material, or a paste obtained by kneading it with a binder, and baking the whole. Alternatively, a sheet or ribbon of wire rod material may be press fitted or upset in a piston ring groove.

The material which can be embedded in these piston rings is, however, limited to a soft material which easily undergoes plastic deformation, or a material which can be baked at a low temperature. These materials are primarily employed to improve the draping and lubricating properties of piston rings, and not expected to be resistant to wear.

Accordingly, it is impossible to embed a wire rod of hard material, such as martensitic high-chromium stainless steel, since its difficulty in plastic deformation disables press fitting or upsetting in a piston ring groove, and moreover, since no baking or other method is possible for fixing it to the piston ring.

SUMMARY OF THE INVENTION

It is an object of this invention to provide a process for manufacturing a piston ring of the type to which a hard material is joined, and which is excellent in productivity and performance.

This invention resides essentially in a process for the manufacture of a piston ring which consists of the following seven features as recited in the claims:

(1) Preparing a base piston ring material in the form of a wire rod and a thinner second wire rod used to form the outer peripheral surface of a piston ring;

(2) (First step) Feeding the base material by rolls at a speed A, and the second wire rod separately from the base material;

(3) (Second step) Supplying the base material and the second wire rod to a pair of rotary disk electrodes to bring the base material and the second wire rod into intimate contact with each other between the electrodes;

(4) (Third step) Supplying an electric current to the electrodes to weld the base material and the second wire rod together;

(5) (Fourth step) Curling a piston ring;

(6) (Fifth step) Cutting away the piston ring; and (7)(Sixth step) Heat treating the piston ring.

DETAILED DESCRIPTION OF THE PREFERRED EMBODIMENTS

The process of this invention will now be described by way of example.

Figure 2:
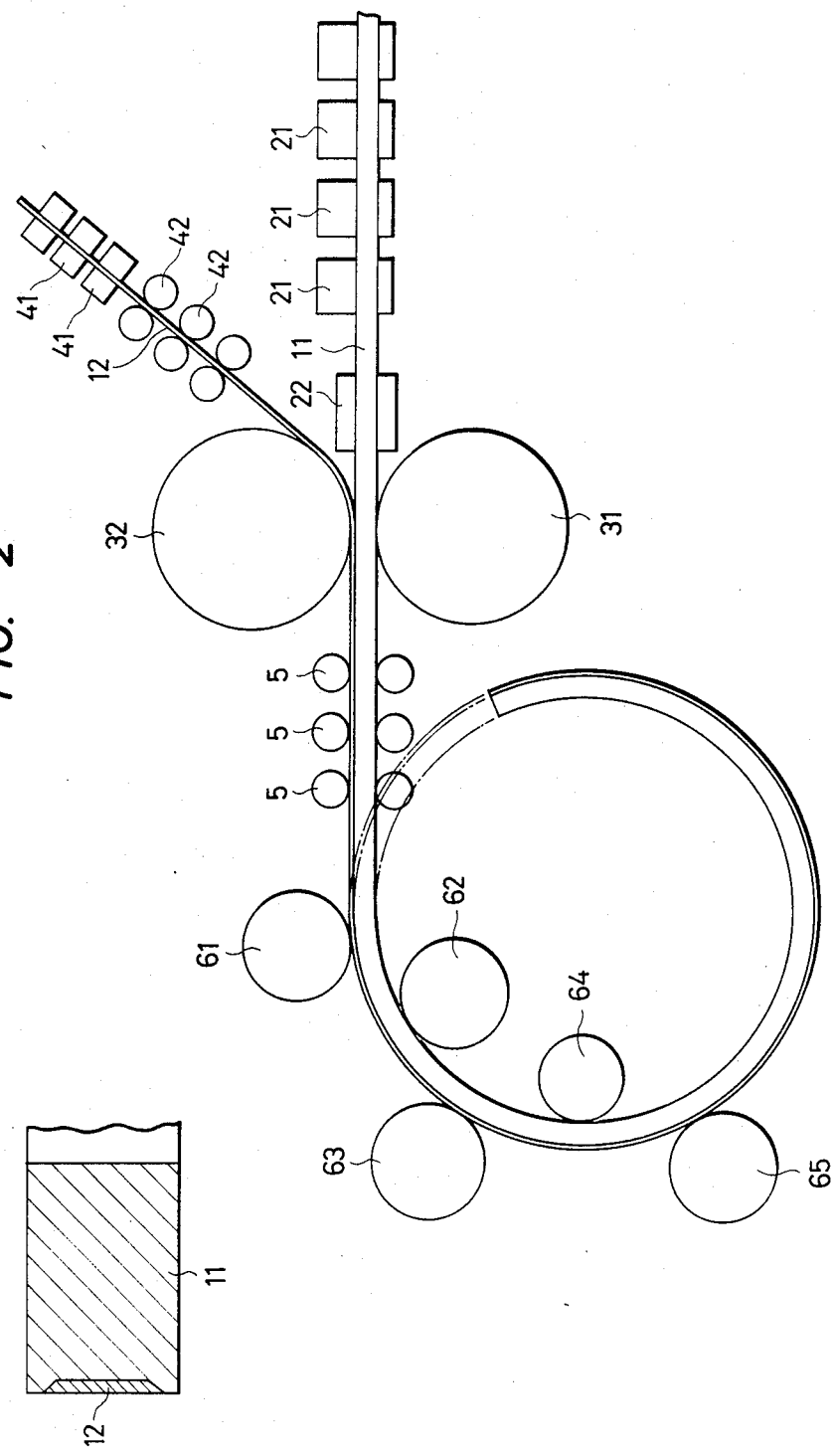
FIG. 2 is a schematic front elevational view illustrating a process embodying this invention.

Referring first to FIG. 2, which is a schematic front elevational view of an apparatus for carrying out the process of this invention, there are shown a base piston ring material 11 in the form of a wire rod and a second wire rod 12 used to form the outer periphery of a piston ring. The base material 11 is fed by rollers 21 from a stock not shown, and supplied to a rotary disk electrode 31 through a guide 22. The second wire rod 12 is fed by guide rollers 41 and feed rollers 42 to a rotary disk electrode 32. The speeds at which the base material and the second wire rod are fed depend on the degree of their thermal deformation, but the second wire rod is preferably fed faster than the base material, so that a piston ring of better performance may be obtained as will be explained later.

The base material 11 and the second wire rod 12 are, thus, applied to a pair of rotary disk electrodes 31 and 32 by which they are brought into intimate contact with each other. An electric current is supplied to the electrodes 31 and 32 continuously or discontinuously so that the resulting heat may melt those portions of the base material and the second wire rod at which they are joined.

The molten portions are cooled by the heat capacity of the piston ring itself, whereby the base material and the second wire rod are welded to each other. Such melting occurs in those portions of high electrical resistance at which the base material and the second wire rod are joined, and does not extend to their outer surfaces, though the base material and the second wire rod may be affected by the heat to some extent.

The welded assembly of the base material and the second wire rod is guided by guide roller 5, and bent into a true circle by five rollers, i.e., three rollers 61, 62 and 63 defining a curling station, and rollers 64 and 65 provided for ensuring curling stability.

This curling is equal to what is usually done for forming a steel piston ring. For example, therefore, if the position of the being roller 63 is changed, it is possible to form a piston ring in the shape of a cam, and if the rollers 61, 62 and 63 are displaced axially (back and forth in FIG. 1), it is possible to form a piston ring in the shape of a coil.

The curled assembly formed with a cam, or wound in a coil is cut to yield a piston ring having split ends.

The piston ring thus formed is heat treated so that the welding stress, the influence of heat remaining in the base material and the second wire rod and the internal stress created by curling may be removed.

This invention enables a strong welded joint which is comparable to an ordinary seam welded plate, and a surface roughness which is not greater than that of the material. It is, however, preferred that the invention be carried out as will hereinafter be described to produce a practically useful piston ring.

The base material for a piston ring for an ordinary engine is required to be of higher machinability and plastic workability, though it may be of lower wear resistance than the second wire rod. The use of a high carbon or low alloy high carbon steel is, therefore, preferred. Austenitic stainless steel or any other steel of high corrosion resistance may be used for a piston ring for a diesel or EGR engine which calls for a wear-resistant piston ring.

A material of high hardness is selected for the second wire rod forming the outer peripheral surface of the piston ring in order to satisfy the requirements for wear resistance, particularly scuffing resistance. Specific examples of the material include martensitic stainless steel, high carbon high alloy steel and high speed steel.

Figure 1:
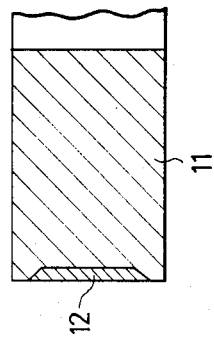
FIG. 1 is a cross sectional view of a conventional piston ring.

According to this invention, a large amount of plastic deformation takes place for forming a straight wire rod into a ring having a diameter of 50 to 150 mm, and creates an extremely high internal stress in the welded joint and the second wire rod. This renders it highly possible that a crack may develop in the second wire rod which is usually very hard and liable to embrittlement, and also in the welded joint. It is, therefore, advisable to employ a higher speed for the second wire rod 12 then for the base material 11, and a higher peripheral velocity for the electrode 32 than for the electrode 31 (by forming the electrode 32 with a larger diameter), so that a compressive stress may be applied to the second wire rod during welding, as shown in FIG. 1.

Figure 3:
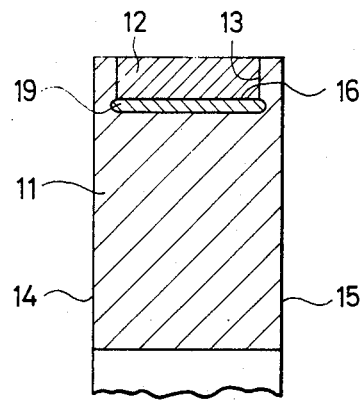
FIGS. 3 to 6 are cross sectional views showing different embodiments of this invention.

The base material 11 is formed with a groove 13 in which the second wire rod 12 is welded, as shown in FIG. 3. The uniform upper and lower surfaces 14 and 15 of the piston ring material 11 ensure high machinability and enable precise working. The second wire rod 12 is welded only to the bottom 16 of the groove 13, and no nugget 19 is formed on the side walls of the groove 13. Therefore, the outer periphery of the piston ring does not have any rough surface, or any uneven surface that would be created if any nugget were exposed.

Figure 4:
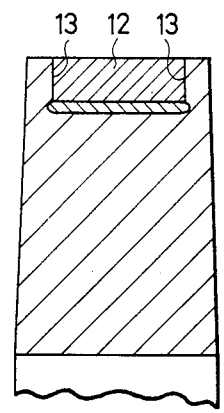

The piston ring to which the second wire rod 12 has been welded in the groove 13 is drawn along its outer periphery when curled, as shown in FIG. 4. The lateral edges of the second wire 12 are brought into intimate contact with the side walls of the groove 13. Therefore, if any clearance exists therebetween when they are welded, the second wire rod 12 is tightly fitted in the groove 13 when they are formed into a ring.

Figure 5:
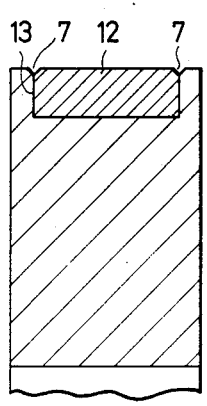

The second wire rod 12 and/or the groove 13 of the base material is preferably formed with chamfered corners 7 as shown in FIG. 5. The chamfered corners 7 prevent any welding nugget from reaching the outer peripheral surface of the piston ring, and remove from the outer periphery of the second wire rod any acute edge that would do damage to a cylinder liner. The chamfered corners 7 also define grooves in which a lubricant may be held. It is preferable that the chamfered corners 7 be preliminarily formed on the base material and the second wire rod, though they can alternatively be formed after the production of a piston ring.

Figure 6:
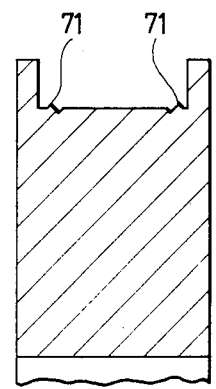

The base material may be formed with projections 71, as shown in FIG. 6, which ensure the improved welding of the second wire rod to the base material. These projections are formed by rolling or otherwise prior to welding.

Figure 7:
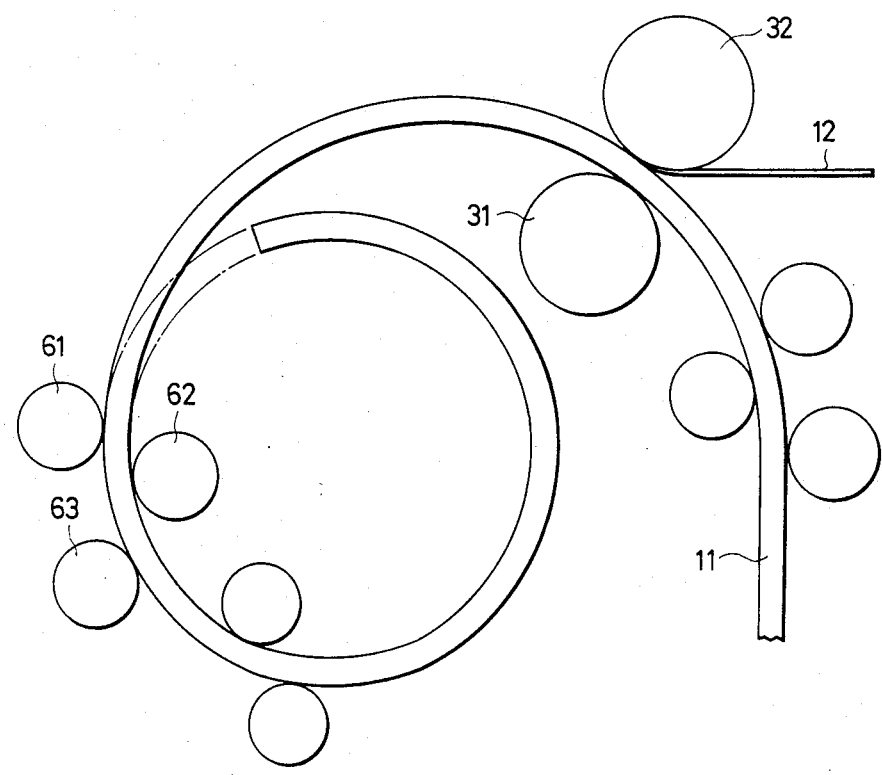
FIG. 7 is a schematic front elevational view illustrating another process embodying this invention.

Referring to FIG. 7 showing another embodiment of this invention, the base material 11 is curved with a prescribed radius of curvature before it is supplied to the rotary disk electrodes 31 and 32, and the welded assembly is curled by the curling rolls 61, 62 and 63. This process prevents any internal stress from arising in the welded joint and the second wire rod when they are curled.

In this connection, it is possible to curve the base material 11 with a radius of curvature which is substantially equal to that with which the assembly is curled into a piston ring. This makes it possible to accomplish curling and welding substantially simultaneously. If any axial coiling speed exists in the direction of travel of the base material through the electrodes, however, a twist stress is created in the welded joint of a piston ring. It is, therefore, advisable to perform welding in a plane in which the piston ring is bent at least during the initial stage of curling.

This invention achieves high productivity by the continuous production of piston rings as in the case of ordinary steel piston rings, wear resistance obtainable by the provision on the outer peripheral surface of a material which is very hard, and hardly capable of plastic deformation, and a high degree of strength with which the wear-resistant layer is joined to the outer peripheral surface of the piston ring.

Moreover, this invention produces a bimetal effect which no ordinary surface coating can achieve. An ordinary surface coating having a thickness of, say, 0.1 to 0.5 mm does not exert any appreciable tension, surface pressure or other influence on the piston ring. In a piston ring of the welded construction as according to this invention, however, the second wire rod has a relatively large thickness which is usually at least 0.5 mm so that the welding nugget may not be exposed on the outer peripheral surface, and the second wire rod is firmly welded to the piston ring. Therefore, the mechanical properties of the second wire rod on the outer peripheral surface have a great influence on the piston ring. In this connection, this invention enables the utilization of a difference between the second wire rod and the base material in thermal expansibility. If a split is designed with a larger radius of curvature (i.e., a low-point split), and if the second wire rod has a high coefficient of thermal expansion than the base material, the split of the piston ring has a smaller radius of curvature (i.e., a high-point split) with an increase in the speed of engine rotation (i.e., with an increase in the temperature of the piston ring), so that no fluttering may occur during the high-speed rotation of the engine.

On the contrary, the base material may have a higher coefficient of thermal expansion than the second wire rod for a piston ring in a two-cycle or diesel engine in which some problems are anticipated with its intake and exhaust ports or the split of the piston ring during its high-speed operation. With an increase in the speed of its rotation, the piston ring has a lowpoint split of greater radius of curvature so that a reduction in wear and blowby may be achieved.

According to this invention, it is advisable to preheat the base material and the second wire rod before welding by the rotary disk electrodes to control the thickness of the nugget to be formed.

This invention can also be carried out if curling is effected by, for example, winding on a mandrel, instead of using three or five rolls as shown in FIG. 1. The heat treatment is performed to remove any welding or curling stress and any influence of heat produced for welding, but if the hardening, or heat treatment for expansion or contraction which is customary in the art of piston ring production is employed, the heat treatment intended solely for stress removal may be unnecessary, since it is achieved by such customary treatment.

What is claimed is:

1. In a process for manufacturing a piston ring for an internal combustion engine having an outer peripheral surface to which a different material is joined to define a sliding surface, said process including preparing a base piston ring material in the form of a wire rod and a thinner second wire rod used to form said outer peripheral surface, the improvement which comprises:

the first step of feeding by ralls both said base material and said second wire rod with said second wire rod being fed separately from said base material;

the second step of supplying said base material and said second wire rod to a pair of rotary disk electrodes to bring said base material and said second wire rod into intimate contact with each other between said electrodes;

the third step of supplying an electric current to said electrodes to weld said base material and said second wire rod together;

the fourth step of curling said welded base material and said second wire rod to form a piston ring with said second wire rod positioned on the outer peripheral surface of said piston ring;

the fifth step of cutting away said piston ring from said welded base material and said second wire rod; and the sixth step of heat treating said piston ring.

2. A process for manufacturing a piston ring as set forth in claim 1, wherein said second wire rod is fed faster than said base material during said first step.

3. A process for manufacturing a piston ring as set forth in claim 1, wherein that surface of said base material which defines said outer peripheral surface has a groove in which said second wire rod is fitted.

4. A process for manufacturing a piston ring as set forth in claim 1, wherein a projection is formed in a groove provided in said base material.

* * * * *